US006715784B2

(12) United States Patent
Koerlin et al.

(10) Patent No.: US 6,715,784 B2
(45) Date of Patent: Apr. 6, 2004

(54) METHOD PROGRAMMING AND OPERATING A WHEELCHAIR HAVING TILT AND RECLINE FUNCTIONS

(75) Inventors: James M. Koerlin, Broomfield, CO (US); Mark E. Greig, Longmont, CO (US)

(73) Assignee: Sunrise Medical HHG Inc., Longmont, CO (US)

(*) Notice: Subject to any disclaimer, the term of this patent is extended or adjusted under 35 U.S.C. 154(b) by 20 days.

(21) Appl. No.: 10/040,279

(22) Filed: Oct. 19, 2001

(65) Prior Publication Data

US 2003/0090089 A1 May 15, 2003

Related U.S. Application Data

(63) Continuation-in-part of application No. 09/583,854, filed on May 31, 2000, now Pat. No. 6,588,792.

(51) Int. Cl.[7] .................................................. B62B 1/00

(52) U.S. Cl. ..................... 280/650; 280/304.1; 297/330

(58) Field of Search ........................... 280/250.1, 304.1, 280/47.38, 650, 657; 180/907, 204; 297/330, 362.11, 411.2, 423.2, DIG. 4, 354.12; 701/49; 318/466, 626, 565

(56) References Cited

U.S. PATENT DOCUMENTS

| | | | |
|---|---|---|---|
| 877,274 | A | 1/1908 | Weber |
| 2,529,532 | A | 11/1950 | Abbott et al. |
| 2,849,051 | A | 8/1958 | Streeter III |
| 3,059,970 | A | 10/1962 | Angell et al. |
| 3,147,038 | A | 9/1964 | Barabas |
| 3,189,385 | A | 6/1965 | Mommsen |
| 3,191,990 | A | 6/1965 | Rugg et al. |
| 3,220,022 | A | 11/1965 | Nelson |
| 3,222,105 | A | 12/1965 | Cross |
| 3,574,399 | A | 4/1971 | Udden |

(List continued on next page.)

FOREIGN PATENT DOCUMENTS

| | | |
|---|---|---|
| CA | 2029917 | 11/1990 |
| GB | 2157557 A | 4/1985 |
| GB | 2158350 A | 11/1985 |

OTHER PUBLICATIONS

The Bureau of National Affairs, Inc. Copyright 2002 (CCPA) 104 USPQ 400.
The Bureau of National Affairs, Inc. Copyright 2002 St. Regis Paper Company V. Bemis comp. Inc. (CA 7) 193 USPQ8 The Bureau of National Affairs, Inc. Copyright 2002 Inre Japikse (CCPA) 86 *USPQ 70.*

*Primary Examiner*—Brian Johnson
*Assistant Examiner*—Han Phan
(74) *Attorney, Agent, or Firm*—MacMillian, Sobanski & Todd, LLC

(57) ABSTRACT

A method of operating a wheelchair during an un-recline process involves a wheelchair having tilt and recline functions, the wheelchair including a seat frame, a tilt actuator for tilting the seat frame, a back frame, a recline actuator for reclining the back frame. A sensor for determining the angle of recline is provided. A controller for controlling the tilt actuator and recline actuator is also provided. The controller is provided with a plurality of preprogrammed sequences for moving the seat frame and the back frame during an unrecline procedure. The sequences include tilting the seat frame as an initial part of the unrecline sequence, wherein the sequences are a function of the initial angle of recline at the initiation of the recline sequence. An initial angle of recline at the initiation of a recline sequence is determined, and the back frame is unreclined according to one of the preprogrammed sequences in response to the determined initial angle of recline.

4 Claims, 9 Drawing Sheets

U.S. PATENT DOCUMENTS

| | | | | | |
|---|---|---|---|---|---|
| 3,597,554 | A | * | 8/1971 | Siegal | 318/466 |
| 3,612,606 | A | | 10/1971 | Swenson | |
| 3,858,938 | A | | 1/1975 | Kristensson et al. | |
| 3,882,949 | A | | 5/1975 | Anderson | |
| 3,883,175 | A | | 5/1975 | Rodaway | |
| 3,934,929 | A | | 1/1976 | Rabinowitz | |
| 4,012,074 | A | | 3/1977 | O'Reilly et al. | |
| 4,054,319 | A | | 10/1977 | Fogg, Jr. et al. | |
| 4,165,901 | A | | 8/1979 | Swenson et al. | |
| 4,176,879 | A | | 12/1979 | Rodaway | |
| 4,204,255 | A | * | 5/1980 | Cremer | 701/49 |
| 4,306,124 | A | * | 12/1981 | Kondo et al. | 297/330 |
| 4,333,681 | A | | 6/1982 | Nelson | |
| 4,339,013 | A | | 7/1982 | Weigt | |
| 4,434,468 | A | * | 2/1984 | Caddick et al. | 701/49 |
| 4,451,887 | A | * | 5/1984 | Harada et al. | 701/49 |
| 4,510,426 | A | * | 4/1985 | Michaels et al. | 318/565 |
| 4,616,874 | A | | 10/1986 | Pietsch et al. | |
| 4,655,471 | A | | 4/1987 | Peek | |
| 4,730,842 | A | | 3/1988 | Summers et al. | |
| 4,732,423 | A | | 3/1988 | Condon | |
| 4,790,553 | A | | 12/1988 | Okamoto | |
| 4,811,226 | A | * | 3/1989 | Shinohara | 701/49 |
| 4,845,620 | A | * | 7/1989 | Parker | 701/49 |
| 4,853,687 | A | * | 8/1989 | Isomura et al. | 701/49 |
| 4,887,017 | A | * | 12/1989 | Ito | 318/626 |
| 4,887,826 | A | | 12/1989 | Kantner | |
| 4,920,338 | A | * | 4/1990 | Tsunoda et al. | 318/466 |
| 4,949,408 | A | | 8/1990 | Trkla | |
| 5,044,647 | A | | 9/1991 | Patterson | |
| 5,127,113 | A | | 7/1992 | Di Matteo et al. | |
| 5,181,762 | A | | 1/1993 | Beumer | |
| 5,187,665 | A | * | 2/1993 | Futami et al. | 701/49 |
| 5,197,007 | A | * | 3/1993 | Parker | 701/49 |
| 5,209,509 | A | | 5/1993 | Gay et al. | |
| 5,214,823 | A | | 6/1993 | Screen | |
| 5,255,956 | A | | 10/1993 | Stevens | |
| 5,292,144 | A | | 3/1994 | Sosnoff | |
| 5,294,141 | A | | 3/1994 | Mentessi et al. | |
| 5,297,021 | A | | 3/1994 | Koerlin et al. | |
| 5,320,412 | A | | 6/1994 | Eakins et al. | |
| 5,328,247 | A | | 7/1994 | Lovins | |
| 5,352,020 | A | | 10/1994 | Wade et al. | |
| 5,356,172 | A | | 10/1994 | Levy et al. | |
| 5,366,036 | A | | 11/1994 | Perry | |
| 5,480,172 | A | | 1/1996 | James | |
| 5,509,673 | A | | 4/1996 | Wu et al. | |
| 5,642,302 | A | | 6/1997 | Dumont et al. | |
| 5,718,442 | A | | 2/1998 | Alexander et al. | |
| 5,751,129 | A | * | 5/1998 | Vergin | 297/330 |
| 5,957,474 | A | | 9/1999 | Mundy et al. | |
| 5,971,482 | A | | 10/1999 | Goertzen et al. | |
| 6,003,624 | A | | 12/1999 | Jorgensen et al. | |
| 6,003,891 | A | | 12/1999 | Broadhead | |
| 6,015,189 | A | | 1/2000 | Broadhead et al. | |
| 6,068,280 | A | | 5/2000 | Torres | |
| 6,076,891 | A | | 6/2000 | Bernhardt | |
| 6,135,228 | A | | 10/2000 | Asada et al. | |
| 6,154,690 | A | | 11/2000 | Coleman | |
| 6,158,810 | A | | 12/2000 | Galloway | |
| 6,168,238 | B1 | | 1/2001 | Hannagan | |
| 6,195,603 | B1 | * | 2/2001 | Gauger et al. | 701/49 |
| 6,206,393 | B1 | | 3/2001 | Mascari et al. | |
| 6,276,704 | B1 | | 8/2001 | Suiter | |

* cited by examiner

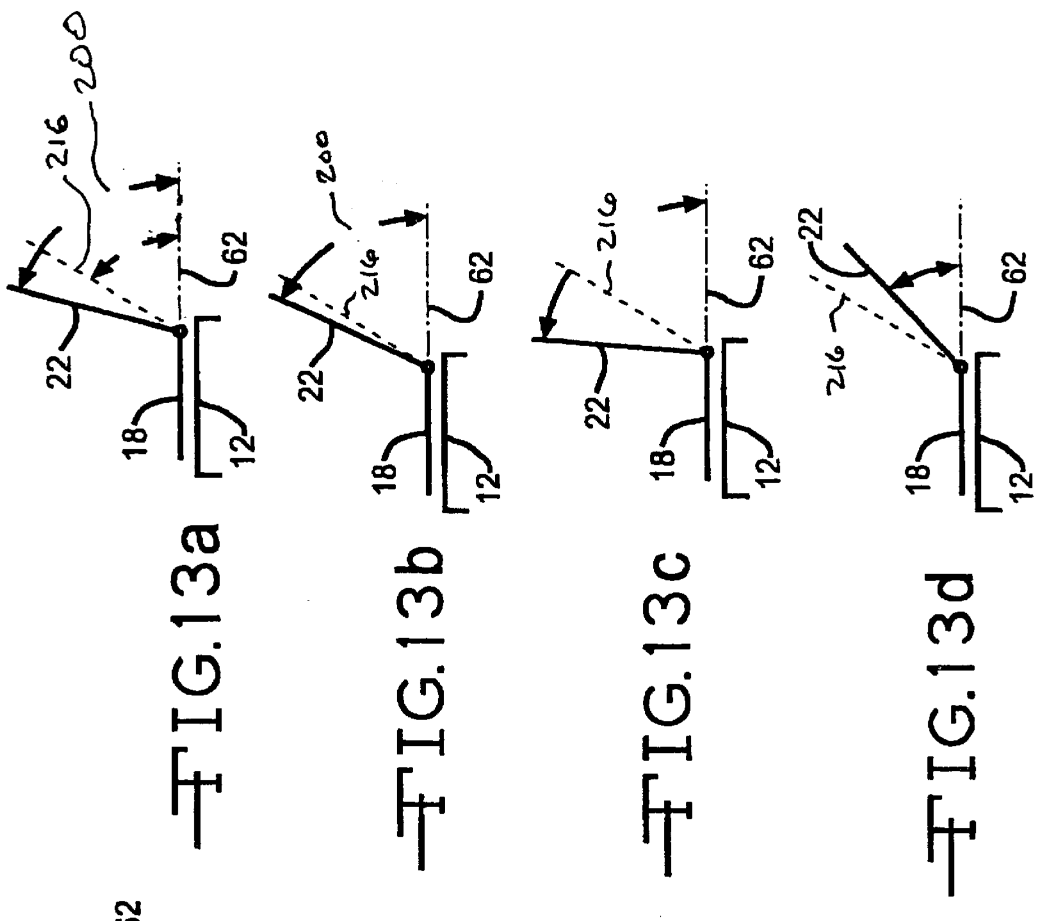
FIG. 13a
FIG. 13b
FIG. 13c
FIG. 13d
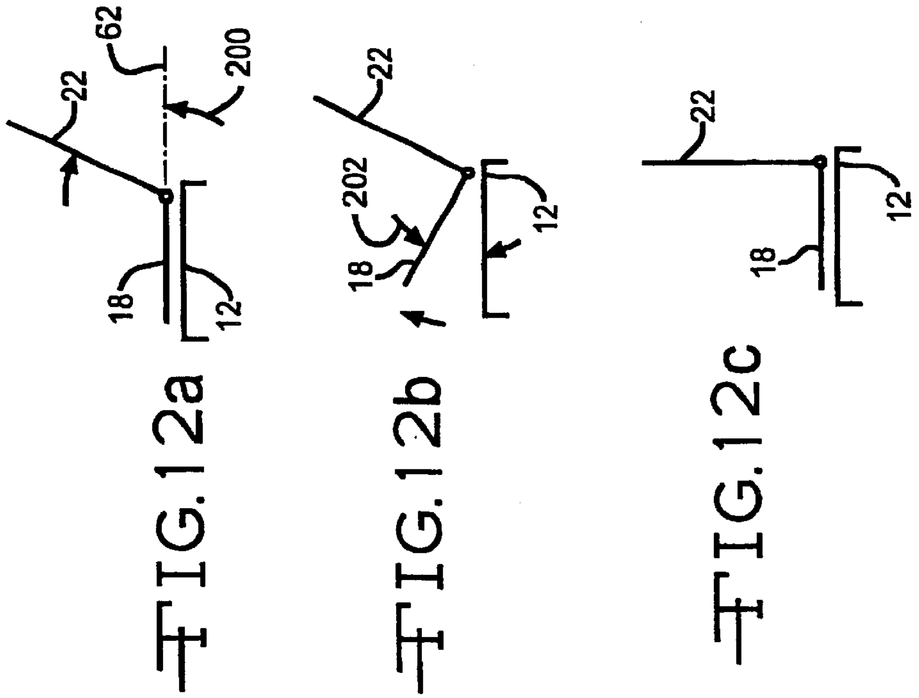
FIG. 12a
FIG. 12b
FIG. 12c

METHOD PROGRAMMING AND OPERATING A WHEELCHAIR HAVING TILT AND RECLINE FUNCTIONS

RELATED APPLICATIONS

This application is a Continuation-In-Part of U.S. Pat. No. 6,588,792, filed May 31, 2000, issued Jul. 8, 2003, and entitled Method of Programming and Operating Tilt and Recline Functions in a Wheelchair.

TECHNICAL FIELD

The present invention relates to wheelchairs, and particularly to wheelchairs capable of moving various movable members such as the seat frame and back fame.

BACKGROUND OF THE INVENTION

Wheelchairs often have a fixed seat consisting of a seating surface and a back frame. The seating surface is usually either horizontal or slightly tilted back, with the front edge of the seating surface slightly higher than the rear edge of that surface. If the wheelchair user sits in the same position in a wheelchair for a long period of time, pressure is continuously applied to the tissue on the portion of the user's body (buttocks, legs, and/or back) that is bearing the user's weight in that position. Blood circulation to that tissue will be reduced, and ulcers or other problems can result.

To avoid these problems, it is necessary for people sitting in wheelchairs to shift their body weight from time to time. This is often accomplished by tilting the seat portion of the wheelchair backwards so that the user's weight is shifted away from the pressure points on the user's body. Also, the user's weight can be shifted by reclining the back frame.

It would be advantageous if there could be developed a wheelchair having improved methods for reclining and/or tilting. Further, it would be advantageous if there could be developed improved methods and apparatus for controlling the movement of various movable wheelchair elements such as back frames, seat frames, head rests, arm rests, leg rests and foot rests.

SUMMARY OF THE INVENTION

The above objects as well as other objects not specifically enumerated are achieved by a method of operating a wheelchair having tilt and recline functions, the wheelchair including a seat frame, a tilt actuator for tilting the seat frame, a back frame, a recline actuator for reclining the back frame. A sensor for determining the angle of recline is provided. A controller for controlling the tilt actuator and recline actuator is also provided. The controller is provided with a plurality of preprogrammed sequences for moving the seat frame and the back frame during an unrecline procedure. The sequences include tilting the seat frame as an initial part of the unrecline sequence, wherein the sequences are a function of the initial angle of recline at the initiation of the recline sequence. An initial angle of recline at the initiation of a recline sequence is determined, and the back frame is unreclined according to one of the preprogrammed sequences in response to the determined initial angle of recline.

According to this invention there is also provided a method of operating a wheelchair having a recline function, the wheelchair including a back frame, a recline actuator for reclining the back frame, a recline sensor for determining the angle of recline, and a controller for controlling the recline actuator. The controller has a memory device. A plurality of angles of recline of the back frame are selected, and data corresponding to the selected angles of recline is stored in the memory device. An input device for a wheelchair operator, and connected to the controller, is provided. The input device has a plurality of switches operatively connected to the controller. The controller is programmed to associate each of the selected angles of recline with one of the switches so that activating each switch causes the controller to access the stored data and return the back frame to the selected angle of recline associated with the switch.

According to this invention there is also provided a method of operating a wheelchair having tilt and recline functions, the wheelchair including a seat frame, a tilt actuator for tilting the seat frame, a back frame, a recline actuator for reclining the back frame, a sensor for determining the angle of recline, and a controller for controlling the tilt actuator and recline actuator. The controller is programmed with a preprogrammed unrecline sequence for moving the seat frame and the back frame during an unrecline procedure. The unrecline sequence includes tilting the seat frame as an initial part of the unrecline sequence. The controller is programmed with a threshold recline angle, above which the unrecline procedure follows the preprogrammed unrecline sequence, and below which the unrecline procedure involves unreclining the back frame without tilting the seat frame. An initial angle of recline at the initiation of unrecline sequences during operation of the wheelchair is determined. The initial angle of recline is compared with the threshold angle. The back frame is unreclined in response to the comparison of the initiation angle with the threshold angle.

According to this invention there is also provided apparatus as disclosed herein to carry out the methods of the invention as described above and elsewhere in the specification and drawings, as well as wheelchairs as described herein.

Various objects and advantages of this invention will become apparent to those skilled in the art from the following detailed description of the preferred embodiment, when read in light of the accompanying drawings.

BRIEF DESCRIPTION OF THE DRAWINGS

FIGS. 12a–12c schematically illustrate an unrecline sequence of the invention, with a low initial angle of recline.

FIGS. 13a–13d schematically illustrate various recline positions of the back frame in relation to a threshold angle of recline.

DETAILED DESCRIPTION OF THE INVENTION

Figure 1:
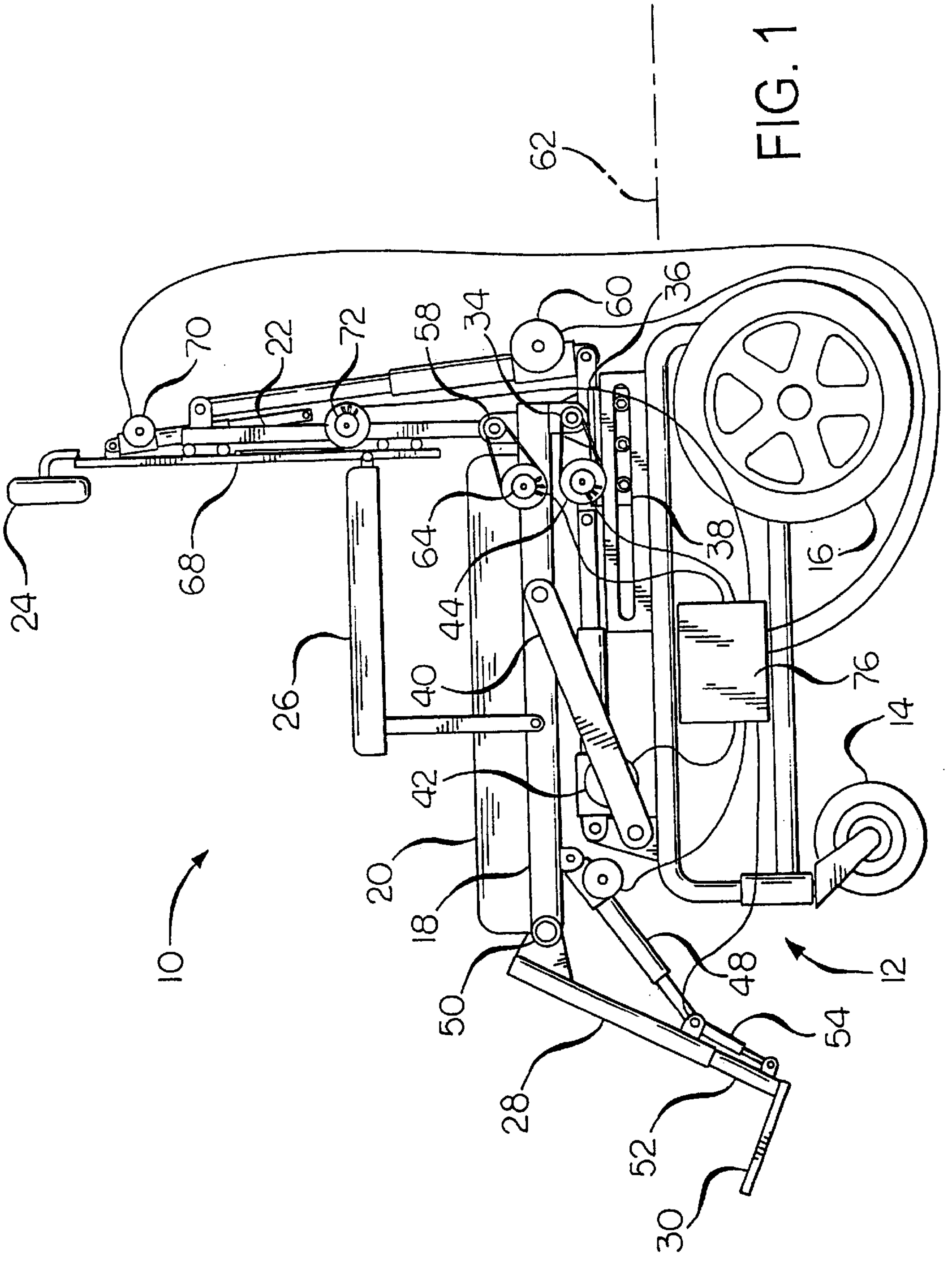
FIG. 1 is a schematic view in elevation of a wheelchair having the tilt and recline features of the invention.

As shown in FIG. 1, a wheelchair indicated generally at 10 is comprised of a wheelchair base 12, which is mounted for movement on front caster wheels 14 and rear drive wheels 16. The wheelchair is preferably provided with a drive motor, not shown, for each of the drive wheels, and a source of power for the drive motors, also not shown. A seat frame 18 supports a seat cushion 20 for the support of the user. A back frame 22 is provided to support the user's body, and a head rest 24 supports the user's head. The user's arms can be supported by armrests, partially shown at 26. Leg rests 28 and footrests 30 are also provided.

The seat frame is mounted for rotation or tilting in a clockwise direction (as shown in FIG. 1) so that the wheelchair user can be tipped back to shift the user's weight for comfort purposes and to relieve pressure from various body parts. The seat frame 18 is pivotally mounted at tilt pivot points 34, which are attached to a carriage 36. The carriage 36 is mounted for a sliding forward and rearward movement along a track or glide 38 fixed to the wheelchair base 12. Any other type of sliding movement can be used. A seat frame rear cross piece, not shown, can be an integral part of the carriage. As the carriage 36 is moved forward within the glide, the tilt pivot points 34, and hence the seat frame, are pulled forward with respect to the wheelchair base 12. A tilt linkage 40 hingedly connects the seat frame 18 to the wheelchair base 12. A tilt actuator 42, which can be an electrically powered linear actuator, is connected to the base to pull the carriage 36 forward with respect to the base, thereby tilting the seat frame 18. As the carriage slides forward, the tilt linkage 40 pushes up the front of the seat frame 18. The seat frame is provided with a tilt sensor 44 that provides an indication of the amount of tilt or rotation of the seat frame with respect to a frame of reference such as the wheelchair base 12. The tilt sensor 44 can be any suitable means for measuring the tilt. A tilt sensor that can be used for measuring tilt (or recline) is a potentiometer that provides an electrical signal indicative of the amount of tilt of the seat frame. Alternatively, pulses generated by a reed switch and magnets associated with the actuator can be used to provide an electrical signal indicative of the amount of tilt or recline. Another means for measuring tilt or recline is a quadrature device. As shown, the tilt sensor 44 can be connected via a belt to the tilt pivot so that the potentiometer rotates upon tilting the seat frame. Although the tilting mechanism illustrated in FIG. 1 uses a horizontally oriented linear actuator, a vertically oriented linear actuator or any other tilting mechanism could be used as well.

The leg rests 28 are adapted with a leg rest actuators 48 that pivot the leg rests about pivot points 50 with respect to the seat frame 18. The leg rests are optionally provided with leg rest extensions 52, powered by extension actuators 54 to stretch out the length of the leg rests, thereby changing the distance between the footrests 30 and the seat frame. The leg rest extensions allow the leg rests to conform to the needs of the wheelchair user. Optionally, the footrests 30 can be pivotally mounted with respect to the leg rests 28, in a manner not illustrated, so that the angle between the footrests and the leg rests can be changed to accommodate the needs of the wheelchair user. It can be seen that the leg rest extensions and the pivoting of the footrests involve the use of movable frame members i.e., the leg rests 28 and the footrests 30, that can be moved to provide the wheelchair with user conforming characteristics. User conforming characteristics means that various frame members are moved to fit the particular physical characteristics of the user throughout various ranges of motion of the movable frame members. In conforming the frame member to the user, the frame member is moved or positioned in such a way as to minimize or eliminate the shear stress and other forces on the user's body. For example, the raising of the leg rests 28 by the action of the leg rest actuator 48 may require a corresponding extension of the leg rest extension 52 by the leg rest extension actuator 54 to accommodate the anatomical needs of the wheelchair user during this particular motion.

The wheelchair back frame 22 is mounted for reclining motion about recline pivot points 58. The recline pivot points can be positioned on the seat frame 18 as shown, or can be positioned on the wheelchair base 12 or on the carriage, as will be explained below. The reclining movement of the back frame can be driven by any suitable mechanism, such as a recline actuator 60 mounted on the carriage. Operation of the recline actuator rotates or reclines the back frame 22 from an initial position, shown in FIG. 1, to a reclined position. The recline actuator 60 is also used to raise up or unrecline the back frame. Although the initial position for the back frame can be any suitable orientation, it is preferably generally vertical, which is roughly 90 degrees with respect to the wheelchair base 12 or with respect to a horizontal line 62. When the back frame 22 is in a vertical position, the recline actuator 60 is vertically oriented. Recline sensors 64, which can be similar to the tilt sensors 44, can be used to measure the amount of recline of the back frame. The recline sensors could also be mounted in the actuator.

The back frame 22 of the wheelchair is provided with a shear plate 68 that is mounted for movement with respect to the back frame. The shear plate 68 can be any suitable back support member, and can be provided with a cushion, not shown. A shear plate actuator 70 is connected to the shear plate 68 and the back frame to move the shear plate with respect to the back frame. The movement of the shear plate is up and down with respect to the back frame, when the back frame is in a vertical orientation. More precisely the movement of the shear place is toward or away from the recline pivots 58. A shear plate sensor 72 measures the amount of movement of the shear plate with respect to the back frame.

The head rest 24 is mounted at the top end of the back frame. The head rest can be mounted for movement along length of the back frame (i.e., vertically in the view shown in FIG. 1) as well as movement forward or rearward with respect to the back frame. Alternatively, the head rest 24 can be mounted on the shear plate 68 for movement relative to the back frame 22. The headrest can be provided with a sensor, not shown, that indicates the position of the headrest with respect to a frame of reference, which can be the back frame 22, the shear plate 68, or the wheelchair base 12.

A controller 76 is provided to control the various wheelchair seating functions and movement of the various movable frame members, i.e., the seat frame 18, back frame 22, head rest 24, arm rests 26, leg rests 28, and foot rests 30. The controller can be any device suitable for controlling the various functions of the wheelchair. Preferably the controller 76 is a computer that is capable of receiving input from the various sensors, storing positioning sequences in a storage device, and sending signals to various actuators for moving the various frame members. For example, sensor 44 for sensing the amount of tilt of the seat frame and sensor recline sensor 64 for sensing the amount of recline of the back frame can be linked by a connection to the controller to enable the controller to be aware of the movement of the seat frame and back frame. The connection can be a hard wire as shown in the drawings, a radio signal device, or any other suitable device for communicating between the sensors and the controller.

The controller can be programmed to maintain limits associated with the tilt and recline features of the wheelchair. The controller can be programmed to allow the speed of the tilt and recline actuators to be adjusted. The controller can be provided with a timer or alarm that can be set to alert the user that it is time to perform a weight shift function.

Figure 4:
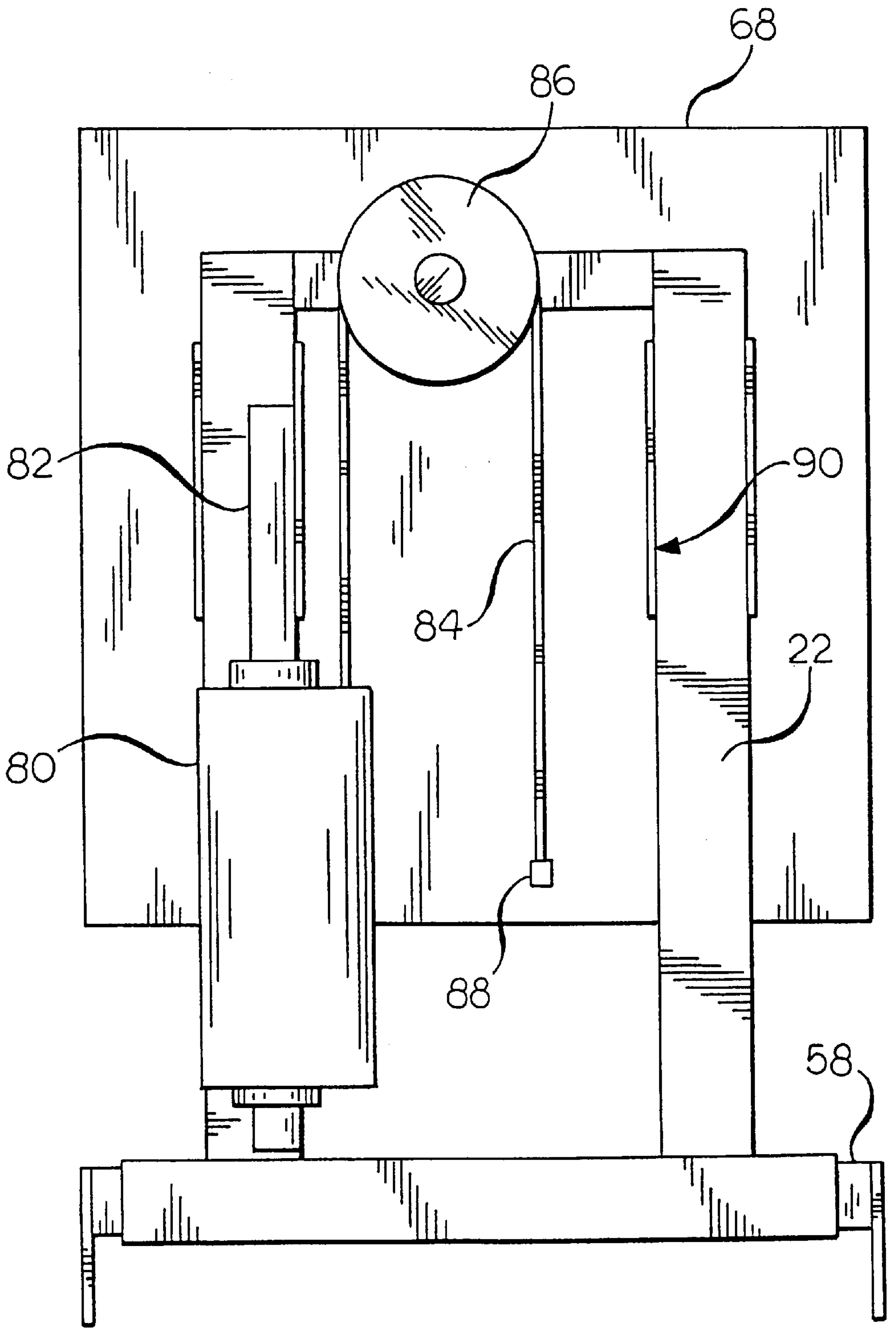
FIG. 4 is a schematic elevational view of the wheelchair back frame and counterbalanced shear plate.

As shown in FIG. 4 the shear plate 68 can be counter-balanced to make it easier to adjust the relative position of the shear plate and the back frame 22. This can be accomplished by providing a counter weight 80 that is preferably mounted for vertical (parallel) movement along a counter-weight guide 82. The counterweight 80 can be mounted by a cable 84 that extends around a pulley 86 and is anchored at a cable anchor 88. Shear guides 90 can optionally be used to guide the shear plate with respect to the back frame 22.

A clutch, not shown, can be associated with the pulley 86, or the any other movable aspect of the shear plate, to selectively allow movement of the shear plate with respect to the back frame. For example, the controller can be programmed so that the clutch allows movement of the shear plate with respect to the back frame only when the back frame is reclining. Other control schemes can be used, such as controlling the pulley to selectively allow movement of the shear plate with respect to the back frame. The controller can be programmed so that the movement of the shear plate with respect to the back frame is normally restricted, but is unrestricted when the back frame is reclining. The term "restricted" means that the relative movement between the shear plate and the back frame is prevented, and "unrestricted" means that the restriction is lifted.

According to one aspect of this invention, there is provided a method of programming the individual shear characteristics of each wheelchair user for his or her particular wheelchair. This is accomplished by taking the user through a recline sequence and measuring the shear generated at the shear plate 68 at each point during the reclining process. This can be done in finite increments or as a continuum. In one embodiment of the invention, the shear is measured at several angles of recline, which means at least four different angles, preferably at least eight angles, and up to as much as an infinite amount of angles in a continuum. Set points or data points that include such information as position and shear measurements are taken during this programming process. Once programmed, the controller 94 will adjust the shear plate during the recline sequence to avoid generating shear between the user and the shear plate 68.

Operation of the programmed controller 94 includes driving the shear plate 68 as the back frame 22 reclines to eliminate any displacement between user and the shear plate. To do this the controller senses the recline angle through the recline sensor 64 and moves the shear plate to a programmed location. The controller 94 can determine the position of the shear plate through the shear sensor. The shear function, that is the position of the shear plate as a function of the recline angle, is unique for each individual user. Furthermore the shape of this function is unique as well. For this reason attempting to set this program with a mechanical linkage and in a linear relationship, as most current systems do, results in a less than satisfactory control pattern. The programming of the controller according to the method of the invention can be accomplished in a variety of ways.

One of the methods used to reduce shear is to counter balance the shear plate 68, as disclosed above in FIG. 4. The shear plate is mounted on the glides 90 to allow it to easily move up and down on the back frame 22. The back frame is pivotally connected for a reclining motion. The counter-weight 80 is mounted to a second glide 82 positioned between it and the back frame 22. This counterweight glide 82 is mounted such that the weight 80 may also travel up and down parallel to the shear plate. The mass of the counter weight 80 is the same as the shear plate 68. With this configuration any shear force present as a result of reclining an individual seated in the chair will cause the shear plate to move and mitigate this force. As the back frame reclines both the shear plate 68 and the counter weight 80 transfer more and more of their weight to the glides 82 and 90, thereby maintaining the initial equilibrium. Preferably, the back is counter-balanced using a weight equivalent to the weight of the shear plate 68 and everything attached to it, such as a back cushion, not shown, the head rest 24, and other equipment associated with the back frame.

A first method of establishing tilt and recline control parameters for a particular user involves sensing the shear forces experienced by the user during a recline operation. As the user reclines, any shear forces that exist will cause the back to travel up or down, thereby mitigating the shear force. The controller will record the readings of the shear plate at intervals during the recline and, using these points, generate a shear function.

A second method of establishing tilt and recline control parameters for a particular user is to recline the back frame 22 and at intervals stop and adjust the shear plate 68. The adjustments are recorded. The controller 94 is used to stop the recline process at predetermined intervals. The user, a therapist or an attendant can make the adjustments.

A third method of establishing the tilt and recline control parameters for a particular user is to use some point on the user's body to follow during the recline programming. This reference point is preferably a reference with respect to the user's head since the head is attached through the spine to the hip, and therefore makes a fairly reliable frame of reference.

In the most preferred embodiment of the invention, the movements of the seat frame 18 and the back frame 22 are independently actuated, but are coordinated for the best kinematic motion for the wheelchair user. To perform a tilt of the seat frame 18 while controlling the angle between the seat frame and the back frame 22, both the tilt actuator 42 for the seat frame 18 and the recline actuator 60 for the back frame are used. For tilt to occur, the seat frame must rotate, and at the same time the recline actuator 60 must rotate the back frame to maintain the seat-to-back angle at a constant level. In this configuration, the recline actuator 60 does not move the back frame 22 in relation to the seat frame 18, but rather in relation to the wheelchair base 12 or the carriage 36.

The controller 94 of the invention is also capable of activating the tilt and recline in concert. One of the advantages of the invention is that the unrecline process, i.e., the process of returning to an upright position from a reclined position, can be accomplished in a manner to overcome the tendency of the user to slide out of the seat during the unrecline process. It has been discovered that during the unrecline process, if the user tilts the seat frame 18 upward before the back fame is unreclined or brought up, the user's hips are stabilized and the unrecline process is more stable for the user, and more repeatable. The controller 94 can coordinate both the tilt and the recline operations into a single function. Several sequences exist.

Figure 2A:
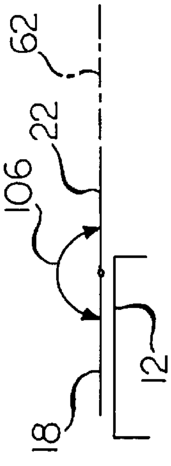
FIGS. 2*a*–2*d* schematically illustrate the unreclining sequence of the invention.
Figure 2B:
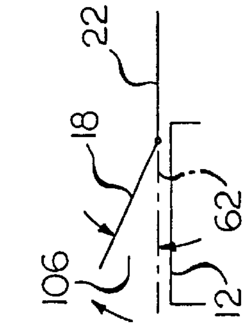
Figure 2C:
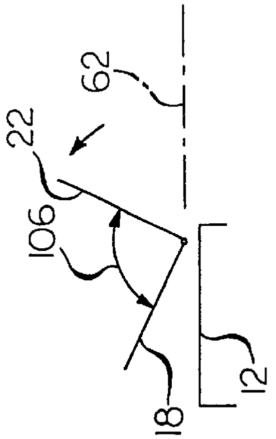
Figure 2D:
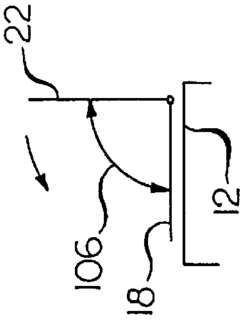

A first unrecline sequence according to this invention is shown in FIGS. 2*a*–2*d*. As shown in FIG. 2*a*, the wheelchair is initially configured with the seat frame 18 untilted with respect to the wheelchair base 12, and with the back frame 22 reclined to an angle generally parallel to the horizontal line 62. The angle formed between the seat frame and the back frame, indicated at 106, is approximately 180 degrees. The unrecline process begins by tilting the seat frame 18 a moderate amount, such as an angle 108 of about 30–45 degrees with respect to the horizontal line 62, for example. This is shown in FIG. 2*b*. The third step is an unreclining of the back frame 22 so that the angle 106 between the seat frame and the back frame is within the range of from about 80 to about 120 degrees, such as about 90 degrees, for example. The final step is bringing both the seat frame and the back frame to an upright position together as the seat-to-back angle 106 is maintained relatively constant, as shown in FIG. 2*d*. By tilting the seat frame 18 prior to the unreclining of the back frame, the wheelchair user is not subject to the forces that would cause a tendency for the wheelchair user to slide out of the wheelchair during the unrecline process.

Figure 3A:
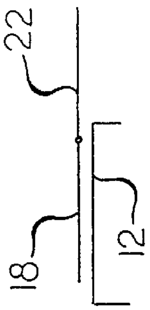
FIGS. 3*a*–3*d* schematically illustrate a different unreclining sequence of the invention.
Figure 3B:
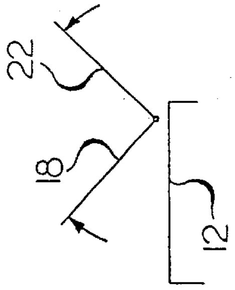
Figure 3C:
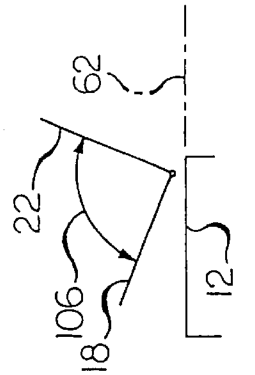
Figure 3D:
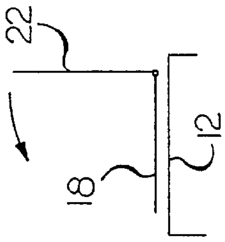

An alternate unrecline sequence is shown in FIGS. 3*a*–3*d*. This sequence is similar to that shown in FIGS. 2*a*–2*d*, except that instead of tilting the seat frame 18 (shown in FIG. 2*b*) prior to beginning the unrecline of the back frame 22 (shown in FIG. 2*c*), the unrecline of the back frame 22 occurs simultaneously with the tilt of the seat frame 18, as shown in FIG. 3*b*. Once the angle 106 between the seat frame and the back frame is brought to within the range of from about 80 to about 120 degrees, as shown in FIG. 3*c*, the seat frame and back frame are both rotated to the upright position, as shown in FIG. 3*d*, while maintaining the angle 106 within the range of from about 80 to about 120 degrees.

Figure 5:
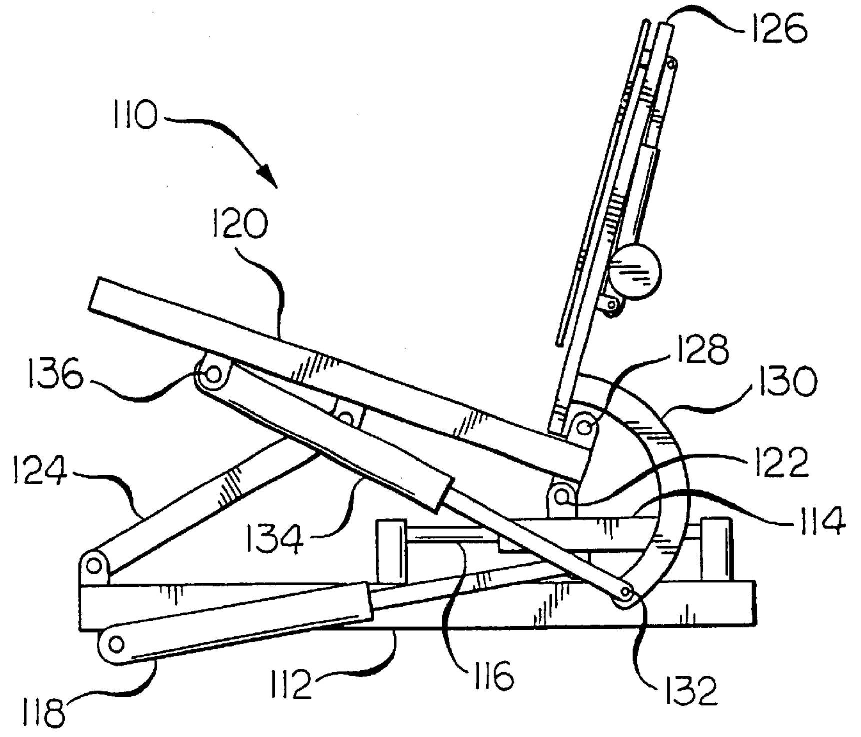
FIG. 5 is a schematic view in elevation of a tilting and reclining wheelchair according to the invention.

Several different arrangements can be used to accomplish the tilting and reclining of the seat frame and the back frame. As shown in FIG. 5, the wheelchair, indicated generally at 110 includes a base 112, and a carriage 114 slidably mounted on a guide member 116 for forward and rearward movement by the action of a linear actuator 118. The seat frame 120 is pivotally mounted on the carriage 114 at pivot point 122, and linked to the base 112 with a pivotally mounted strut 124 so that when the carriage is moved forward the seat frame 120 will tilt or rotate. The carriage 114, strut 124 and actuator 118 comprise a seat frame tilting mechanism for tilting or rotating the seat frame 120.

The back frame 126 is pivotally mounted on the seat frame at pivot point 128, which can be the same as the seat frame pivot point 122, although not shown that way in FIG. 5. A rigid structural member, such as bell crank 130, is connected via pivot point 132 and actuator 134 to the seat frame 120. The bell crank and actuator 134 act together to form a back frame recline mechanism for rotating the back frame 126 with respect to the seat frame. The actuator 134 is pivotally connected to the seat frame 120 at pivot point 136. It can be seen that with no activation of the actuator 134, tilting of the seat frame 120 causes a corresponding movement of the back frame, and the angle between the seat frame and the back frame is maintained constant. Movement or activation of the actuator 134 causes the back frame to move relative to the seat frame, thereby changing the angle between the seat frame and the back frame. It is to be understood that numerous other arrangements can be used to move the back frame relative to the seat frame.

Figure 6:
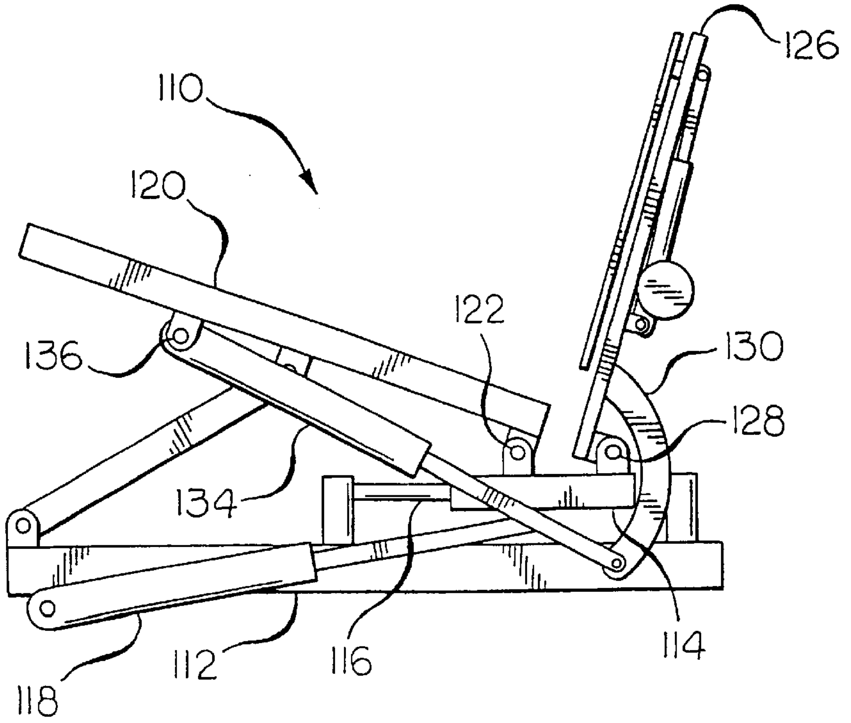
FIG. 6 is a schematic view in elevation of a different tilting and reclining wheelchair according to the invention.

In the wheelchair 110 shown in FIG. 6, the back frame 126 is pivotally mounted at pivot point 128 relative to the carriage 114, and hence relative to the base 112, rather than relative to the seat frame 120. However, the back frame 126 is still actuated with respect to the seat frame 120 by means of the actuator 134 and the bell crank 130, so that movement of the seat frame 120 will cause a similar movement of the back frame 126. This will keep the angle between the seat frame and the seat back relatively constant when the seat frame 120 is tilted, unless the actuator 134 changes that angle.

Figure 7:
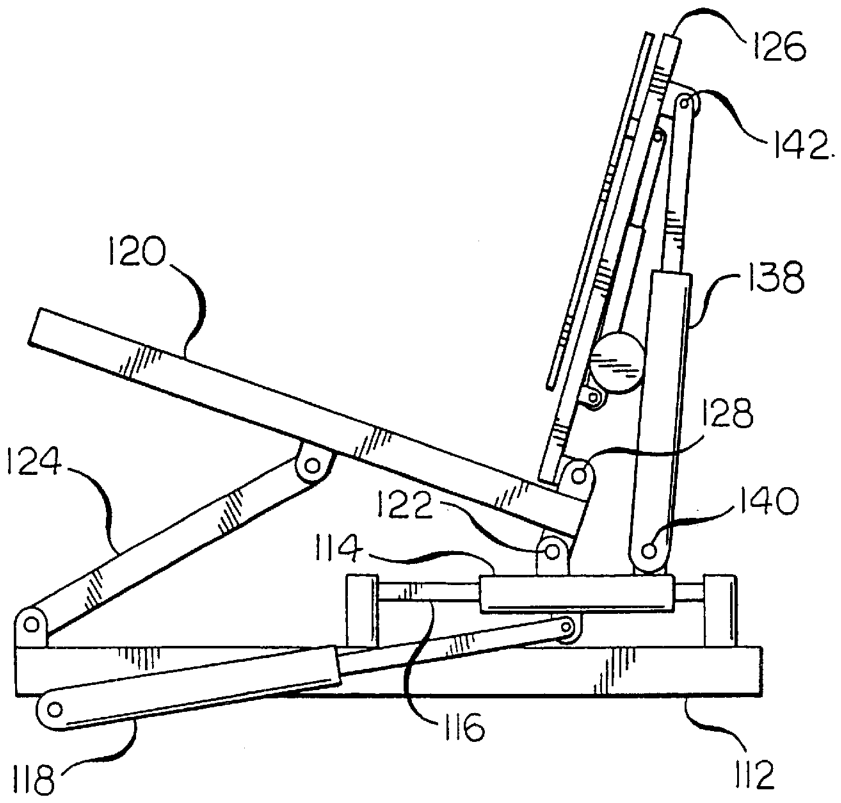
FIG. 7 is a schematic view in elevation of another tilting and reclining wheelchair according to the invention.

The wheelchair 110 illustrated in FIG. 7 includes the seat frame 120 pivotally mounted from the carriage 114 at pivot point 122, and the back frame 126 pivotally mounted from the seat frame at pivot point 128. The back frame 126 is movable with respect to the carriage 114 by means of a back frame actuator 138, pivotally mounted from the carriage at pivot point 140. The back frame actuator 138 is pivotally connected to the back frame 126 at pivotal connection 142. It can be seen that tilting the seat frame 120 will cause some [a significant] movement in the back frame 126 relative to the seat frame, but this movement will not be significant. The back frame is independently operable relative to the tilting of the seat frame. In order to tilt the seat frame and still maintain a constant angle between the seat frame and the back frame, both the seat frame actuator 134 and the back frame actuator 138 must be coordinated.

Figure 8:
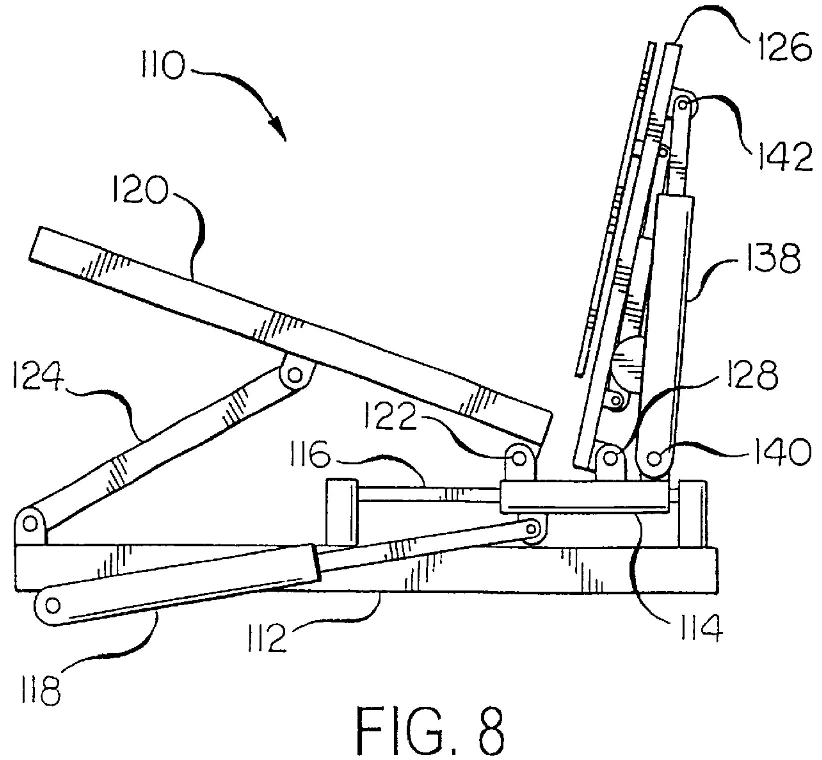
FIG. 8 is a schematic view in elevation of yet another tilting and reclining wheelchair according to the invention.

FIG. 8 illustrates another embodiment of the wheelchair 110 similar to those shown in FIGS. 5–7, but having both the back frame pivot point 128 and the back frame actuator 138 mounted on the carriage 114. It can be seen that tilting of the seat frame 120 will not result in any movement of the back frame 126. The back frame is independently operable relative to the tilting of the seat frame. In order to tilt the seat frame and still maintain a constant angle between the seat frame and the back frame, both the seat frame actuator 134 and the back frame actuator 138 must be coordinated.

Figure 9:
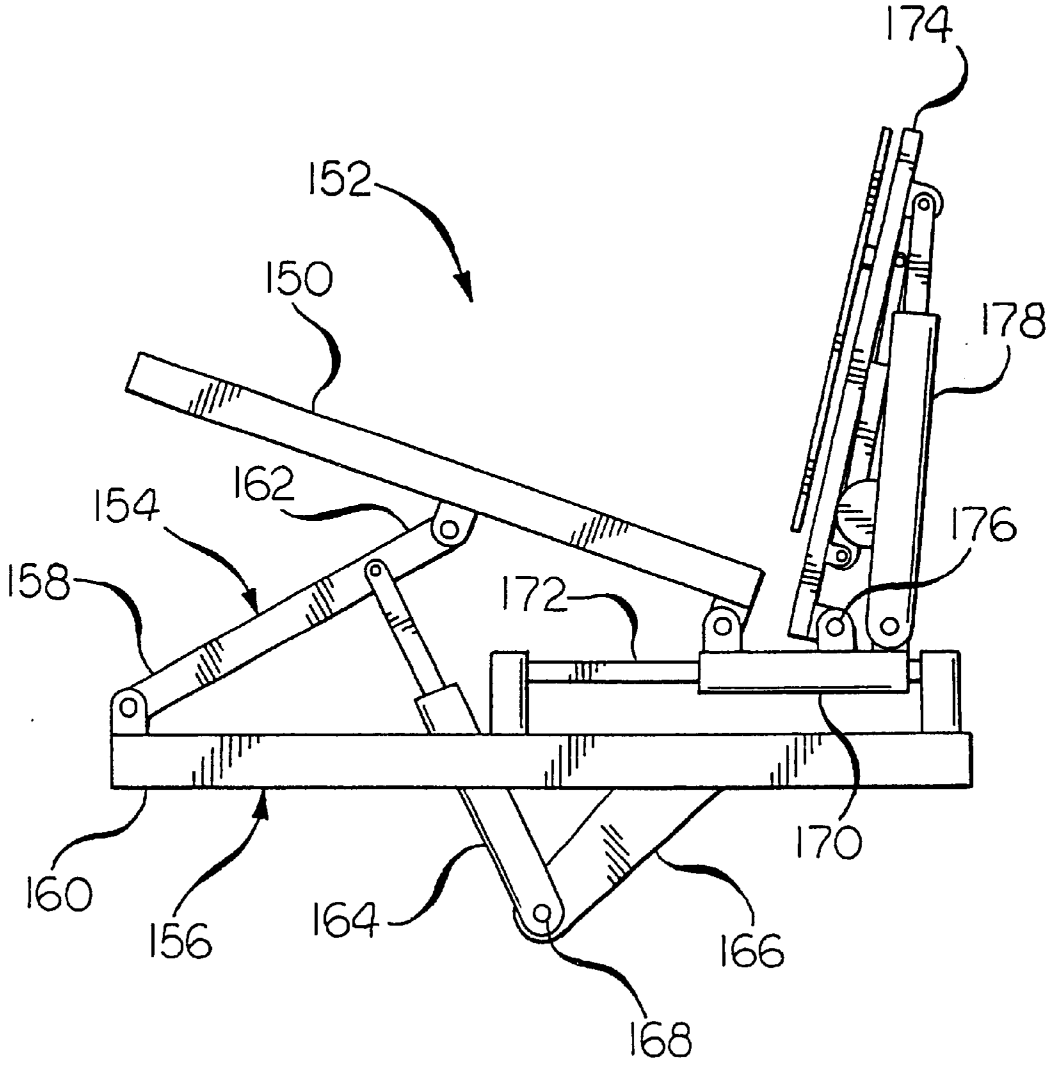
FIG. 9 is a schematic view of a different wheelchair capable of tilting and reclining according to the invention.

As shown in FIG. 9, the seat frame 150 of another wheelchair 152 according to the invention is mounted on a strut 154 for elevation with respect to the base 156. The strut 154 is pivotally mounted at a first end 158 on a forward end 160 of the base and pivotally connected at a second end 162 to the seat frame 150. An actuator 164 is pivotally connected (indirectly) to the base 156 via a support arm 166, at pivot point 168. The actuator is also pivotally connected to the strut. The strut 154 tilts or rotates the seat frame 150. As the seat frame 150 is raised, the carriage 170 is pulled forward on the guide member 172. The back frame 174 is mounted via pivot pin 176 to the carriage 170 and is articulated or reclined by the action of the back frame actuator 178.

Figure 10A:
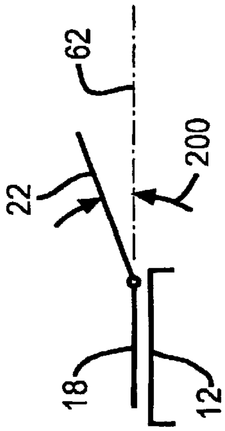
FIGS. 10*a*–10*d* schematically illustrate an unrecline sequence of the invention, with a high initial angle of recline.
Figure 10B:
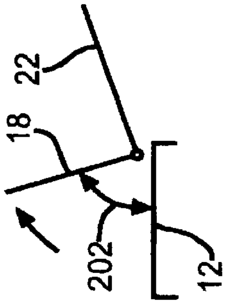
Figure 10C:
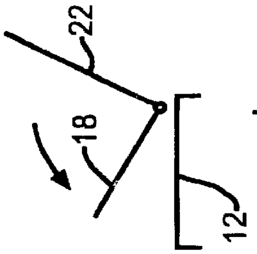
Figure 10D:
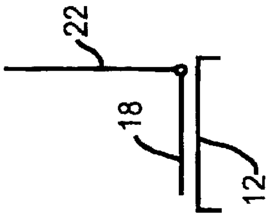

As disclosed above, one of the more useful aspects of the tilt and recline functions in a wheelchair is that the wheelchair can be programmed so that the unrecline sequence includes a certain amount of upward tilt of the seat frame 18 at the beginning of the unrecline process. This initial upward tilting of the seat frame 18 is referred to as pretilt. In one particular embodiment of the invention, as illustrated in FIGS. 10*a*–10*d*, 11*a*–11*d*, and 12*a*–12*c*, the amount pretilt is programmed into the wheelchair controller 76 to be a function of the initial angle of recline at the initiation of the recline sequence. The controller 76 is preprogrammed with a plurality of sequences for moving the seat frame 18 and the back frame 22 during an unrecline procedure. The sequences include tilting the seat frame 18 as an initial part of the unrecline sequence. The sequences involve pretilting the seat frame 18 an amount that is a function of the initial angle of recline at the initiation of a recline sequence. As shown in FIG. 10*a*, the back frame 22 is at a great or high angle of recline 200. (It is to be understood that the actual amount of recline of the back frame is the complimentary angle to angle 200.) When an unrecline procedure is called for, the seat frame 18 is tilted upward first, as shown in FIG. 10*b*, to a tilt angle 202. Then the back frame 22 and seat frame 18 are returned to the original position as shown in FIGS. 10*c* and 10*d*. The various positions of the back frame 22 and seat frame 18 in FIGS. 10*a*–10*d* represent a sequence for the unrecline function.

FIGS. 11*a*–11*d* show an unrecline sequence where the initial angle of recline 200 is somewhat less than the initial recline angle shown in FIG. 10*a*. The unrecline sequence shown in FIGS. 11*a*–11*d* differs from the sequence shown in FIGS. 10*a*–10*d* in that the pretilt angle 202 shown in FIG. 11 *b* is not as great as that required in the sequence shown in FIGS. 10*a*–10*d*.

Figure 11A:
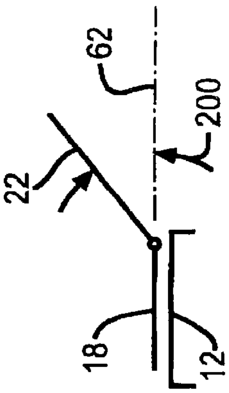
FIGS. 11*a*–11*d* schematically illustrate an unrecline sequence of the invention, with a moderate initial angle of recline.
Figure 11B:
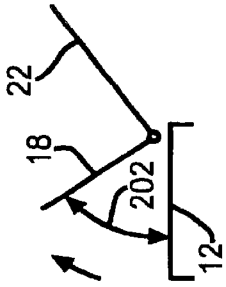
Figure 11C:
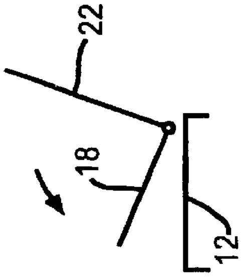
Figure 11D:
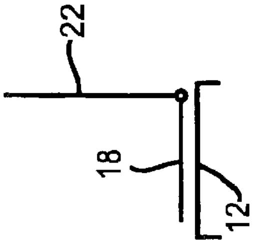

FIGS. 112*a*–12*c* show an unrecline sequence where the initial angle of recline 200 is even less than that shown in FIG. 11*a*. The pretilt angle 202 shown in FIG. 12*b* is accordingly even less than that shown in FIG. 11*b*.

Figure 14:
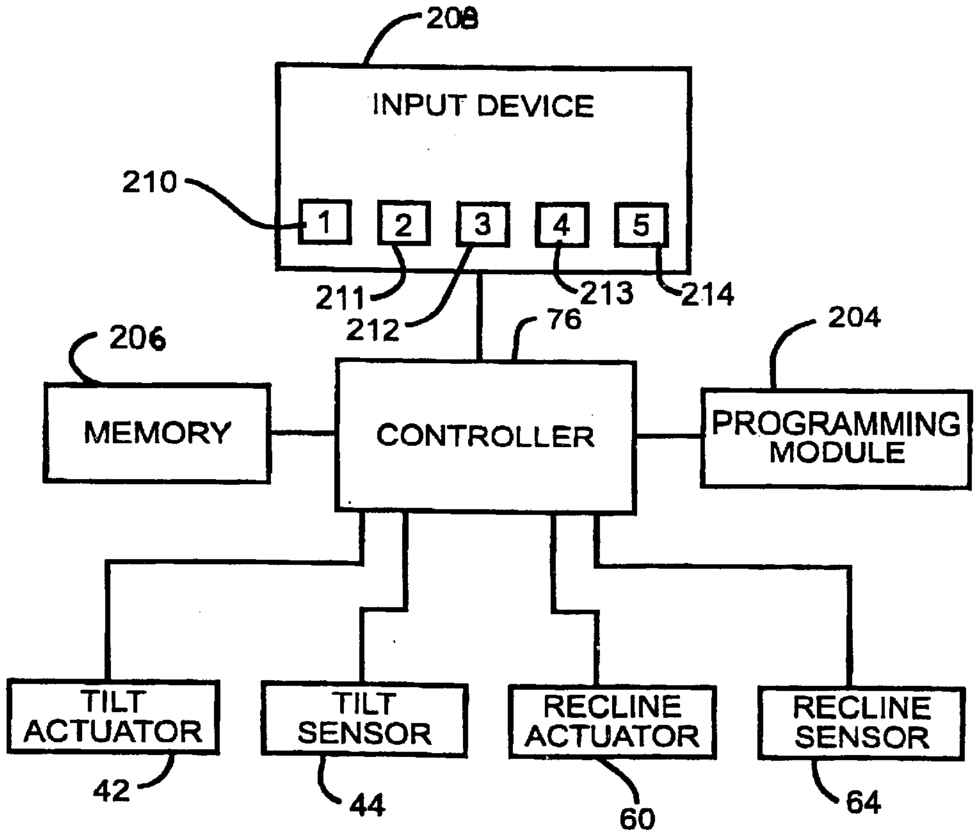
FIG. 14 is a schematic control diagram illustrating apparatus for programming and operating a wheelchair according to an embodiment of the invention.

One of the aspects of this embodiment of the present invention is that the sequence of movement of the back frame 22 and the seat frame 18 can be programmed into the controller 76 so that the sequence can be repeated upon command. It is to be understood that other movable elements of the wheelchair, such as the head rest 24, armrests 26, leg rests 28 and footrests 30 can also be controlled as part of a programmed sequence of operation, similar to the unrecline sequence shown in FIGS. 10*a*–10*d*. It can be seen from FIGS. 10*a*–10*d*, 11*a*–11*d* and 12*a*–12*c* that the back frame is unreclined according to one of the preprogrammed sequences in response to the determined initial angle of recline. Preferably, the preprogrammed sequences provide that greater initial angles of recline involve greater amounts of tilt of the seat frame during the unrecline procedure than the amounts of tilt provided for in the preprogrammed sequences for lesser initial angles of recline. As shown in FIG. 14, the wheelchair can be provided with a programming module 204 that can be connected to the controller 76, either permanently or temporarily for the purpose of programming the controller and entering sequences for movement of various movable members of the wheelchair.

According to another embodiment of the invention, the wheelchair controller 76 is programmable to establish a memory or bookmark for an initial position of the movable elements of the wheelchair so that the wheelchair elements can be returned to the initial position after being moved away from that initial position. This function is referred to as a bookmark. This bookmark function can be used in conjunction with a wheelchair having a recline function, as well as with other functions. The wheelchair includes a back frame 22, a recline actuator 60 for reclining the back frame 22, the recline sensor 64, for determining the angle of recline, and the controller 76 for controlling the recline actuator 60. The controller has a memory device 206, as indicated in FIG. 14. When an unrecline sequence is to begin, the first step is to determine an initial angle of recline of the wheelchair with the recline sensor 64, and then to store data corresponding to the determined initial angle of recline in the memory device 206. Subsequently, the movable members, i.e., the back frame 22 and the seat frame 18, are moved to a different position from the initial position, such as to a different angle of reline and angle of tilt. Thereafter, when it is desired to return to the exact initial location, the controller can access the stored data corresponding to the initial angle of recline and then return the back frame to the initial angle of recline by controlling the recline actuator in response to the stored data. Also, the wheelchair can be provided with an input device 208, shown in FIG. 14, that is connected to the controller 76 for communicating with the controller 76. The input device 208 can be provided with a switch 210 capable of signaling the controller 76 to return the back frame 22 to the initial angle of recline.

This bookmark function can also be used for controlling the angle of tilt by determining an initial angle of tilt of the seat frame 18 with the tilt sensor 44, and storing data corresponding to the determined initial angle of tilt in the memory device. After the seat frame 18 is moved to a different portion resulting in a change in the angle of tilt 202, the seat frame 18 can be returned to the initial angle of tilt by controlling the tilt actuator in response to the stored data corresponding to the initial angle of tilt.

The book mark function can be used to select a plurality of preferred positions for any of the movable members of the wheelchair. Using the recline and unrecline functions as an example, the method of this embodiment involves selecting a plurality of angles of recline of the back frame 22, and storing data corresponding to the selected angles of recline in the memory device 206. The input device 208 is provided with a plurality of switches 210–214 that are operatively connected to the controller 76. The controller is programmed to associate each of the selected angles of recline with one of the switches 210–214 so that activating each switch causes the controller to access the stored data and return the back frame 22 to the selected angle of recline associated with the switch.

This method can also be applied to the movement of the seat frame. The method involves sensing an angle of tilt of the seat frame 18 corresponding with each of the plurality of selected of angles of recline of the back frame 22, and storing data corresponding to the sensed angles of tilt in the memory device 206, wherein the stored data includes a link between each selected angle of recline and its corresponding angle of tilt. The controller is programmed so that activating each switch 210–214 not only returns the back frame to the selected angle of recline associated with the switch, but also returns the seat frame to the angle of tilt linked to the corresponding angle of recline.

It is to be understood that this method applies to any movable member of the wheelchair, including such movable members as the head rest 24, armrests 26, leg rests 28 and footrests 30. One of the particular uses of this aspect of the invention is that the movable members can be programmed to move to positions that are particularly advantageous for different situations. For example, the movable members can be programmed to take up a certain position when the wheelchair is to be moved into a vehicle for transport. Also, a different position for various movable wheelchair members could be provided for when the wheelchair is to be driven up or down a hill or an incline.

In another embodiment of the invention, the wheelchair is provided with a preprogrammed sequence or plurality of sequences of moving various movable wheelchair members, such as for example, the recline and unrecline of the wheelchair back frame 22. The controller 76 can be preprogrammed with one or more unrecline sequences for moving the seat frame 18 and the back frame 22 during an unrecline procedure, where the unrecline sequence includes the pretilt function of tilting the seat frame as an initial part of the unrecline sequence. The controller is programmed with a threshold angle of recline, indicated at 216 in FIG. 13. The controller will respond to a command to unrecline the back frame 22 in one of two ways, depending on whether or not the initial angle of recline exceeds the threshold angle. If the initial angle of recline is above the threshold angle, as shown in FIG. 13*d*, then the unrecline procedure follows the preprogrammed unrecline sequence, which typically would include the pretilt function. However, if the initial angle of recline is below the threshold angle 216, as illustrated in FIGS. 13*a*, 13*b* and 13*c*, then the unrecline procedure involves unreclining the back frame without tilting the seat frame. Therefore, when a command to unrecline is given to the controller 76, there is first a determination as to the initial angle of reline 200. A comparison of the initial angle of recline with the threshold angle is made. If the angle of recline is beyond the threshold angle, then the unrecline process is carried out according to the preprogrammed sequences, and if the initial angle is not above the threshold angle, the recline is carried out in a straightforward manner. It can be seen that the unreclining of the back frame is controlled in response to the comparison of the initiation angle with the threshold angle.

One particular benefit of being able to provide the threshold angle is to enable a wheelchair user to vary the angle of recline at relatively small angles of recline without requiring the tilt function to be engaged. This will be helpful where a wheelchair user is using the wheelchair at a desk, for example, and requires only small adjustments in the angle of recline. Preferably, the controller is provided with a capability for modifying the threshold angle. This could be accomplished using the programming module 204 or the input device 208.

Although the present invention has been described primarily in conjunction with a recline and unrecline function, it is to be understood that the principles of programming control of the movement of movable wheelchair members according to this invention can apply to other movable wheelchair members, such as head rests, arm rests, leg rests and foot rests.

The principle and mode of operation of this invention have been described in its preferred embodiments. However, it should be noted that this invention may be practiced otherwise than as specifically illustrated and described without departing from its scope.

What is claimed is:

1. The method of operating a wheelchair having tilt and recline functions, the wheelchair including a seat frame, a tilt actuator for tilting the seat frame, a back frame, a recline actuator for reclining the back frame, a sensor for determining the angle of recline, and a controller for controlling the tilt actuator and recline actuator, the method comprising:

programming the controller with a plurality of preprogrammed sequences for moving the seat frame and the back frame during an unrecline procedure, the sequences including tilting the seat frame as an initial part of the unrecline sequence, wherein the sequences are a function of the initial angle of recline at the initiation of the recline sequence;

determining an initial angle of recline at the initiation of a recline sequence; and unreclining the back frame according to one of the preprogrammed sequences in response to the determined initial angle of recline.

2. The method of claim 1 in which the preprogrammed sequences for greater initial angles of recline provide for greater amounts of tilt of the seat frame during the unrecline procedure than the amounts of tilt provided for in the preprogrammed sequences for lesser angles of initial angles of recline.

3. The method of operating a wheelchair having tilt and recline functions, the wheelchair including a seat frame, a tilt actuator for tilting the seat frame, a back frame, a recline actuator for reclining the back frame, a sensor for determining the angle of recline, and a controller for controlling the tilt actuator and recline actuator, the method comprising:

programming the controller with a preprogrammed unrecline sequence for moving the seat frame and the back frame during an unrecline procedure, the unrecline sequence including tilting the seat frame as an initial part of the unrecline sequence;

programming the controller with a threshold recline angle, above which the unrecline procedure follows the preprogrammed unrecline sequence, and below which the unrecline procedure involves unreclining the back frame without tilting the seat frame;

determining an initial angle of recline at the initiation of unrecline sequences during operation of the wheelchair;

comparing the initial angle of recline with the threshold angle; and unreclining the back frame in response to the comparison of the initiation angle with the threshold angle.

4. The method of claim 3 including providing the controller with a capability for modifying the threshold angle.

* * * * *